United States Patent [19]
Spies

[11] Patent Number: 6,147,609
[45] Date of Patent: Nov. 14, 2000

[54] UNOBSTRUCTED FENCE SECURITY SYSTEM

[76] Inventor: Bill Spies, 8 Spies Rd., Ft. Mitchell, Ala. 36856

[21] Appl. No.: 09/224,312

[22] Filed: Dec. 31, 1998

[51] Int. Cl.[7] ................................................ G08B 23/00
[52] U.S. Cl. ...................... 340/573.2; 340/332; 340/539; 340/573.3; 340/691.4; 340/692
[58] Field of Search .................. 340/573.3, 556, 340/539, 573.2, 692, 691.1, 691.4, 691.5, 326, 331, 332; 116/214, 22 A

[56] References Cited

U.S. PATENT DOCUMENTS

| | | |
|---|---|---|
| 3,725,895 | 4/1973 | Haynes .................................. 340/572.1 |
| 4,910,500 | 3/1990 | Carr ....................................... 340/573.3 |
| 5,009,192 | 4/1991 | Burman ............................. 340/573.2 X |
| 5,019,802 | 5/1991 | Brittain et al. ........................... 340/522 |
| 5,023,597 | 6/1991 | Salisbury ............................ 340/556 X |
| 5,241,923 | 9/1993 | Janning ............................ 340/573.3 X |
| 5,257,012 | 10/1993 | Metcalf ................................ 340/573.2 |
| 5,892,446 | 4/1999 | Reich ................................ 340/573.2 X |

*Primary Examiner*—Thomas Mullen

[57] ABSTRACT

A barrier opening security system is provided for use with a barrier having an opening. Also included is a deterrent device mounted on the barrier adjacent to the opening for maintaining the opening unobstructed and further for deterring the passage of a being therethrough upon the actuation thereof.

9 Claims, 3 Drawing Sheets

UNOBSTRUCTED FENCE SECURITY SYSTEM

BACKGROUND OF THE INVENTION

1. Field of the Invention

The present invention relates to barrier devices and more particularly pertains to a new unobstructed fence security system for precluding the passage of animals through a fence opening without obstructing the same.

2. Description of the Prior Art

The use of barrier devices is known in the prior art. More specifically, barrier devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,123,967; U.S. Pat. No. 4,537,116; U.S. Pat. No. 4,679,034; U.S. Pat. No. 5,196,826; U.S. Pat. No. 4,577,437; and U.S. Pat. No. Des. 339,758.

In these respects, the unobstructed fence security system according to the present invention substantially departs from the conventional concepts and designs of the prior art, and in so doing provides an apparatus primarily developed for the purpose of precluding the passage of animals through a fence opening without obstructing the same.

SUMMARY OF THE INVENTION

In view of the foregoing disadvantages inherent in the known types of barrier devices now present in the prior art, the present invention provides a new unobstructed fence security system construction wherein the same can be utilized for precluding the passage of animals through a fence opening without obstructing the same.

The general purpose of the present invention, which will be described subsequently in greater detail, is to provide a new unobstructed fence security system apparatus and method which has many of the advantages of the barrier devices mentioned heretofore and many novel features that result in a new unobstructed fence security system which is not anticipated, rendered obvious, suggested, or even implied by any of the prior art barrier devices, either alone or in any combination thereof.

To attain this, the present invention generally comprises a fence with a pair of vertically oriented posts fixed within a ground surface and spaced with relation to each other to define an opening therebetween. A first one of the posts includes a housing with a rectangular configuration having a height equal to that of the posts and a width at least twice that of the posts. The housing has a front face, a rear face, an inboard face, an outboard face, a top face, and a bottom face. The inboard face of the housing has a pair of clamps mounted thereon for releasably coupling with the first post. As such, the housing is maintained in parallel relationship with the first post. Mounted at an angle on the top face of the housing is a solar panel which is connected to a rechargeable battery for powering purposes. It should be noted that waterwheels and windmills may be employed in combination with generators for powering purposes or charging the battery. Alternating current sources may also be utilized. Also included is a pair of light assemblies each including a strip with a length greater than a width of the housing. A plurality of linearly aligned lights are mounted on the strip which are adapted to illuminate one-at-a-time from a first end to a second end upon the actuation thereof. The first end of each strip of the light assemblies is mounted to one of the posts and extends outwardly therefrom. An odor expelling assembly is provided including an air generator mounted on the rear face of the housing for generating air. Also mounted on the rear face of the housing is an air tank for storing pressurized air generated by the air generator. The odor expelling assembly further includes an outlet pipe buried within the ground surface between bottom ends of the posts. An end of the outlet pipe is connected to the air tank for receiving air therefrom. A plurality of outlets are equally spaced along the outlet pipe and extend upwardly through the ground surface for expelling the pressurized air therefrom. Coupled between the outlet pipe and the air tank is an odor container for dispensing an odorous liquid within the air upon the supply of air to the outlet pipe from the air tank. Lastly, a solenoid valve is connected between the outlet pipe and the air tank for allowing the supply of air to the outlet pipe only upon the actuation thereof. A further component mounted on the rear face of the housing is a speaker for emitting an audible sound upon the actuation thereof. A motion detector is mounted on the rear face of the housing adjacent to the top face thereof for generating a trip signal upon the detection of motion within a predetermined distance. Positioned within the housing is a first transmitter adapted for transmitting an activation signal of a predetermined intensity upon the actuation thereof. Associated therewith is a second transmitter also positioned within the housing, but adapted for transmitting a trip indication signal upon the actuation thereof. A receiver is positioned within the housing for receiving an arm signal and a disarm signal via free space. The controller is situated within the housing and connected between the battery, light assemblies, solenoid valve of the odor expelling assembly, speaker, motion detector, first transmitter, second transmitter, and receiver. Upon the receipt of an arm signal, the controller serves to continuously actuate the first transmitter. Further, upon the receipt of the trip signal, the controller actuates the light assemblies, solenoid valve of the odor expelling assembly, speaker, and second transmitter. A mobile control module includes a portable transmitter connected to an arm button for transmitting the arm signal upon the depression thereof. Such portable transmitter is further connected to a disarm button for transmitting a disarm signal upon the depression thereof. It is shown that the mobile control module further includes a portable receiver connected to a light for illuminating the same only upon the receipt of the trip indication signal. Finally, a plurality collars are each adapted for being removably secured on an animal. Each collar includes a shocking device for providing the animal with a shock upon the actuation thereof. While not shown, a receiver serves to actuate the shocking device upon the receipt of the activation signal via free space, thereby preventing the being from proceeding through the unobstructed fence security system.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new unobstructed fence security system apparatus and method which has many of the advantages of the barrier devices mentioned heretofore and many novel features that result in a new unobstructed fence security system which is not anticipated, rendered obvious, suggested, or even implied by any of the prior art barrier devices, either alone or in any combination thereof.

It is another object of the present invention to provide a new unobstructed fence security system which may be easily and efficiently manufactured and marketed.

It is a further object of the present invention to provide a new unobstructed fence security system which is of a durable and reliable construction.

An even further object of the present invention is to provide a new unobstructed fence security system which is susceptible of a low cost of manufacture with regard to both materials and labor, and which accordingly is then susceptible of low prices of sale to the consuming public, thereby making such unobstructed fence security system economically available to the buying public.

Still yet another object of the present invention is to provide a new unobstructed fence security system which provides in the apparatuses and methods of the prior art some of the advantages thereof, while simultaneously overcoming some of the disadvantages normally associated therewith.

Still another object of the present invention is to provide a new unobstructed fence security system for precluding the passage of animals through a fence opening without obstructing the same.

Even still another object of the present invention is to provide a new unobstructed fence security system that is for use with a barrier having an opening. Also included is a deterrent device mounted on the barrier adjacent to the opening for maintaining the opening unobstructed and further for deterring the passage of a being therethrough upon the actuation thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
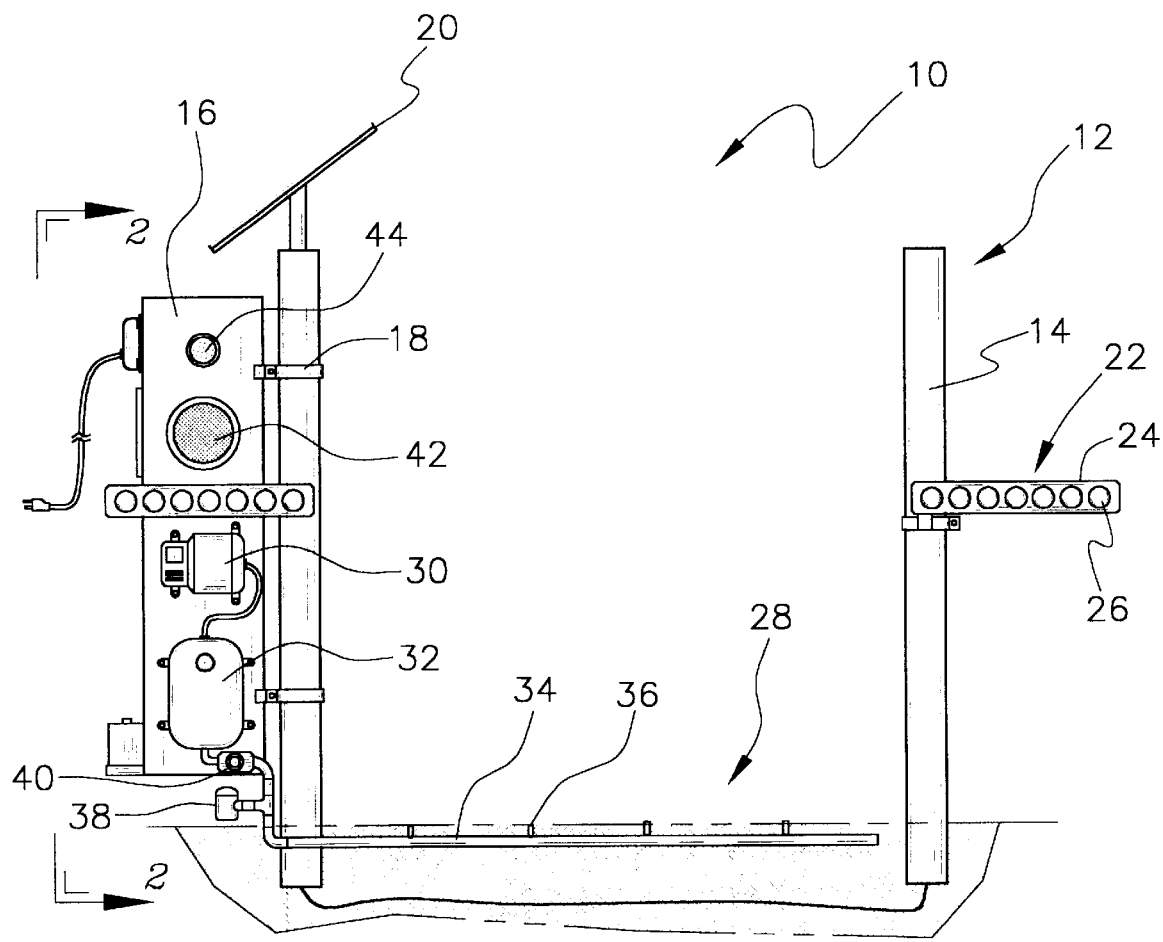
FIG. 1 is a front view of a new unobstructed fence security system according to the present invention.

With reference now to the drawings, and in particular to FIGS. 1 through 4 thereof, a new unobstructed fence security system embodying the principles and concepts of the present invention and generally designated by the reference numeral 10 will be described.

Figures 2, 3:
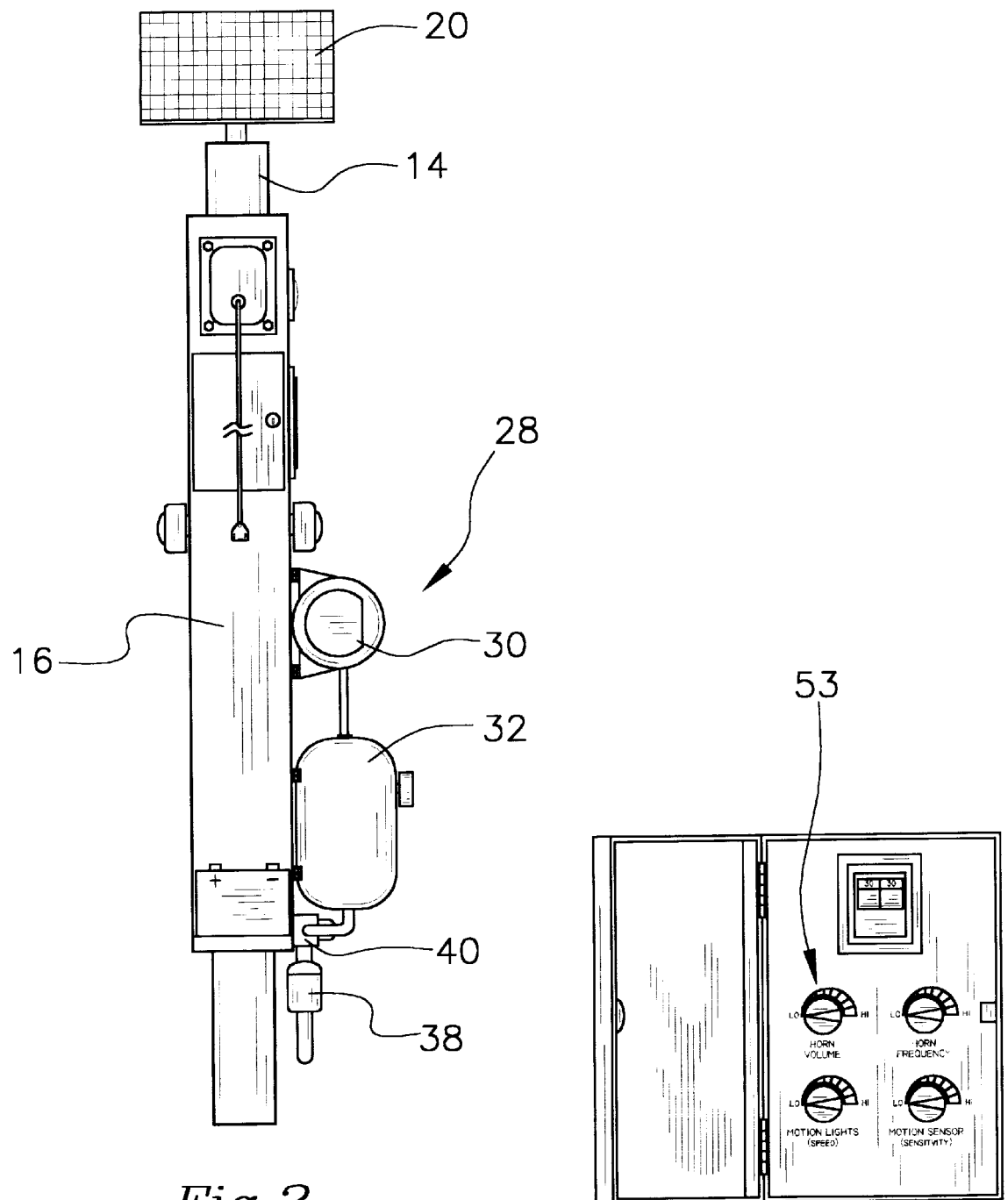
FIG. 2 is a side view of the present invention.
FIG. 3 is a front view of a control panel associated with the controller of the present invention.

The present invention, designated as numeral 10, includes a fence 12 with a pair of vertically oriented posts 14 fixed within a ground surface and spaced with relation to each other to define an opening therebetween. A first one of the posts includes a housing 16 with a rectangular configuration having a height equal to that of the posts and a width at least twice that of the posts. As shown in FIGS. 1 & 2, the housing has a front face, a rear face, an inboard face, an outboard face, a top face, and a bottom face. The inboard face of the housing has a pair of clamps 18 mounted thereon for releasably coupling with the first post. As such, the housing is maintained in parallel relationship with the first post, as shown in FIG. 1.

Mounted at an angle on the top face of the housing is a solar panel 20 which is connected to a rechargeable battery for powering purposes. It should be noted that waterwheels and windmills may be employed in combination with generators for powering purposes or charging the battery. Alternating current sources may also be utilized in combination with an AC-DC converter. Also included is a pair of light assemblies 22 each including a strip 24 with a length greater than a width of the housing. A plurality of linearly aligned high intensity lights 26 are mounted on the strip which are adapted to illuminate one-at-a-time from a first end to a second end upon the actuation thereof. As shown in FIG. 1, the first end of each strip of the light assemblies is mounted to one of the posts and extends outwardly therefrom.

An odor expelling assembly 28 is provided including an air generator 30 mounted on the rear face of the housing for generating air. Also mounted on the rear face of the housing is an air tank 32 for storing pressurized air generated by the air generator. The odor expelling assembly further includes an outlet pipe 34 buried within the ground surface between bottom ends of the posts. An end of the outlet pipe is connected to the air tank for receiving air therefrom. A plurality of outlets 36 are equally spaced along the outlet pipe and extend upwardly through the ground surface for expelling the pressurized air therefrom. Coupled between the outlet pipe and the air tank is an odor container 38 for dispensing an odorous liquid in combination with the pressurized air upon the supply of air to the outlet pipe from the air tank. Lastly, a solenoid valve 40 is connected between the outlet pipe and the air tank for allowing the supply of air to the outlet pipe only upon the actuation thereof. It should be noted that pressurized liquid such as water may be expelled in lieu of air for affording a more effective barrier. The pressurized liquid may be supplied in a manner similar to that in which the air is generated or supplied via a pipeline from a home or barn. In the case where a pipe line is used, the solenoid valve is mounted directly thereon. If a pipeline is not employed, a large sealed reservoir is utilized to store the liquid prior to use to avoid constant refilling. It should also be noted that the odor may be added directly to the liquid or added thereto via a container similar to the one hereinabove.

Figure 4:
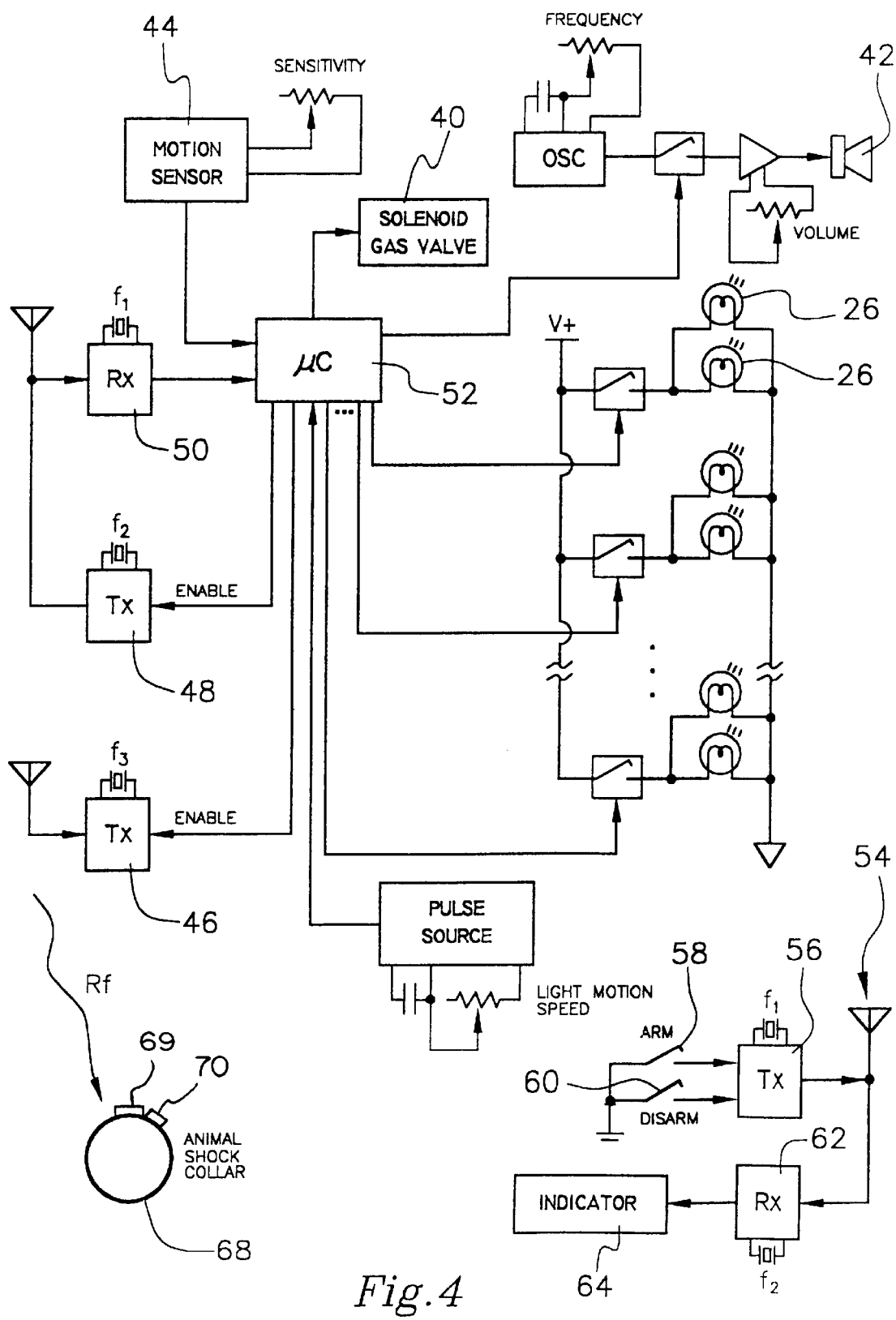
FIG. 4 is a schematic diagram of the present invention.

A further component mounted on the rear face of the housing is a speaker 42 for emitting an audible sound upon the actuation thereof. It should be noted that such audible sound may or may not be inaudible sound to humans while audible to animals. A motion detector 44 is mounted on the rear face of the housing adjacent to the top face thereof for generating a trip signal upon the detection of motion within a predetermined distance. Positioned within the housing is a first transmitter 46 adapted for transmitting an activation signal of a predetermined intensity upon the actuation thereof, as shown in FIG. 4. Associated therewith is a second transmitter 48 also positioned within the housing, but adapted for transmitting a trip indication signal upon the actuation thereof. A receiver 50 is positioned within the housing for receiving an arm signal and a disarm signal via free space.

As shown in FIG. 4, a controller 52 is situated within the housing and connected between the battery, light assemblies, solenoid valve of the odor expelling assembly, speaker, motion detector, first transmitter, second transmitter, and receiver. Upon the receipt of an arm signal, the controller serves to continuously actuate the first transmitter. Further, upon the receipt of the trip signal, the controller actuates the light assemblies, solenoid valve of the odor expelling assembly, speaker, and second transmitter. As such, any beings are deterred from passing through the opening of the fence.

As shown in FIGS. 3 & 4, the speaker preferably has a pair of dials 53 associated therewith which are connected to the controller. Such dials allow a user to selectively determine a volume and a frequency of the audible sound that is emitted. Another dial is preferably connected to a pulse source which governs the actuation of the light assemblies are actuated. By this feature, a rate at which the lights of the light assemblies may be selectively governed. Finally, a motion sensitivity dial is included for selecting a sensitivity of the motion sensor. Each of the foregoing dials are preferably positioned within a panel having a lid for protection purposes.

FIG. 4 further shows a mobile control module 54 including a portable transmitter 56 connected to an arm button 58 for transmitting the arm signal upon the depression thereof. Such portable transmitter is further connected to a disarm button 60 for transmitting a disarm signal upon the depression thereof. Upon the receipt of the disarm signal, the controller no longer reacts to trip signals from the motion detector or actuates the first transmitter. As such, a user may pass through the fence opening. With reference still to FIG. 4, it is shown that the mobile control module further includes a portable receiver 62 connected to a light 64 for illuminating the same only upon the receipt of the trip indication signal. It should be noted that the control module may take the form of a scanner for monitoring a plurality of gates. As an option, such scanner may be positioned within a vehicle or the like.

Finally, a plurality of collars 68 are each adapted for being removably secured on an animal. Each collar includes a shocking device for providing the animal with a shock upon the actuation thereof. While not shown, a receiver 70 serves to actuate the shocking device 69 upon the receipt of the activation signal via free space, thereby preventing the being from proceeding through the unobstructed fence security system.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fence opening security system comprising, in combination:

a fence with a pair of vertically oriented posts fixed within a ground surface and spaced with respect to each other to define an opening therebetween, a first one of the posts including a housing with a rectangular configuration having a height equal to that of the posts and a width at least twice that of the posts, the housing having a front face, a rear face, an inboard face, an outboard face, a top face, and a bottom face, the inboard face of the housing having a pair of clamps mounted thereon for releasably coupling with the first post such that the same is maintained in parallel relationship therewith;

a power source;

a pair of light assemblies each including a strip with a length greater than a width of the housing and having a plurality of linearly aligned lights mounted thereon which are adapted to illuminate one-at-a-time from a first end to a second end upon the actuation thereof, the first end of each strip of the light assemblies being mounted to one of the posts and extending outwardly therefrom;

an odor expelling assembly including an air generator mounted on the rear face of the housing for generating air, an air tank mounted on the rear face of the housing for storing pressurized air generated by the air generator, an outlet pipe buried within the ground surface between bottom ends of the posts and having an end connected to the air tank for receiving air therefrom and a plurality of outlets equally spaced and extending upwardly through the ground surface for expelling the pressurized air therefrom, an odor container coupled between the outlet pipe and the air tank for dispensing an odorous liquid within the air upon the supply of air to the outlet pipe from the air tank, and a solenoid valve connected between the outlet pipe and the air tank for allowing the supply of air to the outlet pipe only upon the actuation thereof;

a speaker mounted on the rear face of the housing above the odor expelling assembly for emitting a sound upon the actuation thereof;

a motion detector mounted on the rear face of the housing adjacent to the top face thereof for generating a trip signal upon the detection of motion within a predetermined distance;

a first transmitter positioned within the housing and adapted for transmitting an activation signal of a predetermined intensity upon the actuation thereof;

a second transmitter positioned within the housing and adapted for transmitting a trip indication signal upon the actuation thereof;

a receiver positioned within the housing and adapted for receiving an arm signal and a disarm signal via free space;

a controller situated within the housing and connected between the power source, light assemblies, solenoid valve of the odor expelling assembly, speaker, motion detector, first transmitter, second transmitter, and receiver, the controller, only upon the receipt of an arm signal, adapted to continuously actuate the first transmitter and actuate the light assemblies, solenoid valve of the odor expelling assembly, speaker, and second transmitter only upon the receipt of the trip signal;

a mobile control module including a portable transmitter connected to an arm button for transmitting the arm signal upon the depression thereof and connected to a disarm button for transmitting a disarm signal upon the depression thereof, the mobile control module further including a portable receiver connected to a light for illuminating the same only upon the receipt of the trip indication signal; and a plurality of collars each adapted for being removably secured on an animal, each collar including a shocking device for providing the animal with a shock upon the actuation thereof and a receiver adapted to actuate the shocking device upon the receipt of the activation signal via free space.

2. A barrier opening security system for use with a barrier with an opening, the system comprising:

a deterrent device mounted on the barrier adjacent to the opening for maintaining the opening unobstructed and further for deterring the passage of a being therethrough upon the actuation thereof;

wherein the deterrent device includes an odor expelling assembly; and wherein the odor expelling assembly includes an air generator for generating air, an air tank for storing pressurized air generated by the air generator, an outlet pipe buried within a ground surface along the opening and having an end connected to the air tank for receiving air therefrom and at least one outlet extending upwardly through the ground surface for expelling the pressurized air therefrom, and an odor container coupled between the outlet pipe and the air tank for dispensing an odorous liquid within the air upon the supply of air to the outlet pipe from the air tank.

3. A barrier opening security system as set forth in claim 2 wherein the deterrent device includes a pair of light assemblies each including a plurality of linearly aligned lights adapted to illuminate from a first end to a second end upon the actuation thereof, an end of each strip of the light assemblies being mounted to one side of the opening and extending outwardly therefrom.

4. A barrier opening security system as set forth in claim 2 wherein the deterrent device includes a speaker for emitting an audible sound upon the actuation thereof.

5. A barrier opening security system as set forth in claim 2 wherein the deterrent device is actuated by a motion detector.

6. A barrier opening security system as set forth in claim 2 and further including a remote module adapted for providing an indication upon the actuation of the deterrent device.

7. A barrier opening security system as set forth in claim 2 and further including a remote control module adapted for selectively precluding the actuation of the deterrent device.

8. A barrier opening security system as set forth in claim 2 wherein the deterrent device includes a transmitter adapted for transmitting an activation signal of a predetermined intensity upon the actuation thereof and a plurality of collars each adapted for being removably secured on an animal, each collar including a shocking device for providing the animal with a shock upon the actuation thereof and a receiver adapted to actuate the shocking device upon the receipt of the activation signal via free space.

9. A barrier opening security system for use with a barrier with an opening, the system comprising:

a deterrent device mountable on the barrier adjacent to the opening for maintaining the opening unobstructed and further for deterring the passage of a being therethrough upon the actuation thereof;

wherein the deterrent device includes an odor expelling assembly; and wherein the odor expelling assembly includes an air compressor for pressurizing air, an air tank for storing air pressurized by the air compressor, an outlet pipe buried within a ground surface along the opening and having an end connected to the air tank for receiving air therefrom and at least one outlet extending upwardly through the ground surface for expelling the pressurized air therefrom, and an odor container coupled between the outlet pipe and the air tank for dispensing an odorous liquid within the air upon the supply of air to the outlet pipe from the air tank.

* * * * *